United States Patent
Mehr et al.

(10) Patent No.: US 10,899,239 B2
(45) Date of Patent: Jan. 26, 2021

(54) BODY VENTING AND SEALING MEMBER

(71) Applicant: GM GLOBAL TECHNOLOGY OPERATIONS LLC, Detroit, MI (US)

(72) Inventors: Daniel K. Mehr, Walled Lake, MI (US); Craig W. Stumpf, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 46 days.

(21) Appl. No.: 16/443,317

(22) Filed: Jun. 17, 2019

(65) Prior Publication Data
US 2020/0391599 A1    Dec. 17, 2020

(51) Int. Cl.
*B60L 50/60* (2019.01)
*F16L 5/02* (2006.01)

(52) U.S. Cl.
CPC .............. *B60L 50/66* (2019.02); *F16L 5/02* (2013.01); *B60L 2270/00* (2013.01)

(58) Field of Classification Search
CPC ........ B60L 50/66; B60L 2270/00; F16L 5/02; H02G 3/0675; H02G 15/068; E06B 7/14; G02B 6/4459
See application file for complete search history.

(56) References Cited

U.S. PATENT DOCUMENTS

| | | | | |
|---|---|---|---|---|
| 4,813,453 A | * | 3/1989 | Jenkins | B60K 15/03504 137/588 |
| 6,394,464 B1 | * | 5/2002 | Moreau | H02G 3/0675 174/652 |
| 8,979,557 B2 | * | 3/2015 | Dinh | H02G 3/0691 439/100 |

* cited by examiner

*Primary Examiner* — Faye M Fleming
(74) *Attorney, Agent, or Firm* — Quinn IP Law

(57) ABSTRACT

A system for sealed venting of a compartment includes a sealing member having a first body portion and a second body portion, an inner sealing member surface defining a central passage passing longitudinally from a first terminal end of the sealing member to a second terminal end of the sealing member, an outer sealing member surface defining an outer circumference of the sealing member, a sealing flange extending radially outward from the outer sealing member surface, and a channel including at least one stop surface. A securing member having a securing flange engages with the second body portion. The channel engages with the aperture defined in the body when the sealing member is inserted into and rotated in the aperture and the sealing flange and the securing flange seal the sealing member to the inner and outer surfaces of the body.

16 Claims, 3 Drawing Sheets

BODY VENTING AND SEALING MEMBER

INTRODUCTION

The present disclosure relates generally to a sealing member or grommet and specifically to an ergonomic twist and seal grommet.

In the automotive industry, wire bundles, shafts, cables, or tubing are often passed through apertures in a bulkhead panel of a vehicle as it is being built. A grommet is desirable to protect the bundle, cabling, or tubing from the sharp edges of the aperture. In some applications, the grommet is intended to seal an opening and such designs typically included one or more fasteners to seal and pull/push the grommet into position, causing uneven seating of the seal surface.

SUMMARY

Embodiments according to the present disclosure provide a number of advantages. For example, embodiments according to the present disclosure enable installation of a sealing member or grommet from an interior location with even distribution of the grommet seal surface around the entire aperture surface. The sealing member is secured by an additional fastener installed from an exterior location. The sealing member can be monitored and logged for installation error proofing and/or traceability if desired.

A system for sealed venting of a compartment defined by a body having an inner surface and an outer surface and an aperture defined therethrough, according to an exemplary embodiment, includes a sealing member. The sealing member includes a first body portion and a second body portion, the second body portion having a threaded outer surface. The sealing member also includes an inner sealing member surface defining a central passage passing longitudinally from a first terminal end of the sealing member to a second terminal end of the sealing member and coaxial with a longitudinal axis of the sealing member, an outer sealing member surface defining an outer circumference of the sealing member, a sealing flange extending radially outward from the outer sealing member surface, and a channel formed in the sealing member and separating the first body portion from the second body portion, the channel including at least one stop surface. The system further includes a sealing portion positioned between the sealing flange and the inner surface of the body and a securing member having a securing flange, the securing member configured to engage with the threaded outer surface of the second body portion such that the securing flange is adjacent to the outer surface of the body. The channel engages with the aperture defined in the body when the sealing member is inserted into and rotated in the aperture and the sealing portion and the securing flange seal the sealing member to the inner and outer surfaces of the body.

In an exemplary embodiment, the sealing member further comprises a locking tab extending radially outward from the outer sealing member surface of the first body portion.

In an exemplary embodiment, the system further comprising a venting line configured to engage with the locking tab of the sealing member, the venting line defining a passage connected to the central passage to direct a flow of fluid from the compartment to an exterior environment of the body.

In an exemplary embodiment, the inner sealing member surface includes at least one rib configured to engage with the venting line.

In an exemplary embodiment, the sealing member further comprises a hand lever extending radially outward from the first body portion, the hand lever including a grasping portion radially separated from and parallel to the longitudinal axis of the sealing member.

In an exemplary embodiment, the at least one stop surface engages with the aperture of the body to inhibit rotation of the sealing member when the securing member engages with the threaded outer surface of the second body portion of the sealing member.

In an exemplary embodiment, the securing flange applies pressure to the outer surface of the body and the securing flange applies pressure to the sealing portion positioned between the securing flange and the inner surface of the body to seal the aperture in the body and create a venting passage from the compartment through the central passage.

An automotive vehicle, according to an exemplary embodiment of the disclosure, includes a vehicle body having an inner surface and an outer surface and an aperture formed therein by an aperture edge, the aperture edge comprising a tab extending radially into the aperture and a sealing member. The sealing member includes a first body portion and a second body portion, the second body portion including a threaded outer surface. The sealing member also includes an inner sealing member surface defining a central passage extending through the first and second body portions of the sealing member and coaxial with a longitudinal axis of the sealing member and an outer sealing member surface defining a first outer circumference of the sealing member. The sealing member further includes a sealing flange extending radially outward from the outer sealing member surface and defining a second outer circumference of the sealing member, a channel including a stop surface, and a securing member having a securing flange, the securing member configured to engage with the threaded outer surface of the second body portion. The stop surface engages with the tab when the sealing member is inserted into and rotated in the aperture to limit rotation of the sealing member within the aperture.

In an exemplary embodiment, the automotive vehicle further comprising a sealing portion positioned between the sealing flange and the inner surface of the vehicle body.

In an exemplary embodiment, the securing flange applies pressure to the outer surface of the body and the sealing portion and the securing flange seal the sealing member to the inner and outer surfaces of the vehicle body.

In an exemplary embodiment, the sealing member further comprises a locking tab extending radially outward from the outer sealing member surface.

In an exemplary embodiment, the automotive vehicle further comprising a venting line configured to engage with the locking tab of the sealing member, the venting line defining a passage connected to the central passage of the sealing member to direct a flow of fluid to an exterior environment of the vehicle body.

In an exemplary embodiment, the inner sealing member surface includes at least one rib configured to engage with the venting line.

In an exemplary embodiment, the sealing member further comprises a first hand lever extending radially outward from a first radial position of the first body portion and a second hand lever extending radially outward from a second radial position 180 degrees from the first radial position, the first hand lever including a first grasping portion and the second hand lever including a second grasping portion, each of the first and second grasping portions radially separated from and parallel to the longitudinal axis of the sealing member.

In an exemplary embodiment, the stop surface engages with the tab extending from the aperture edge of the aperture of the vehicle body to inhibit rotation of the sealing member when the securing member engages with the threaded outer surface of the second body portion of the sealing member.

A method for sealed venting of a battery compartment enclosed by a body, according to an exemplary embodiment of the disclosure, includes providing the body, the body having an inner surface and an outer surface and an aperture defined therethrough, the aperture defined by an edge including a tab and providing a sealing member. The sealing member includes a first body portion and a second body portion having a threaded outer surface. The sealing member also includes an inner sealing member surface defining a central passage passing longitudinally from a first terminal end of the sealing member to a second terminal end of the sealing member and coaxial with a longitudinal axis of the sealing member, an outer sealing member surface defining an outer circumference of the sealing member, a sealing flange extending radially outward from the outer sealing member surface, and a channel formed in the sealing member and separating the first body portion from the second body portion, the channel including a stop surface. The method further includes providing a sealing portion and providing a securing member having a securing flange, the securing member configured to engage with the threaded outer surface of the second body portion. The method also includes positioning the sealing portion against the inner surface of the body, inserting the sealing member into the aperture from an interior of the battery compartment such that the sealing portion is between the inner surface of the body and the sealing flange, rotating the sealing member within the aperture such that the stop surface engages with the tab of the aperture, and threading the securing member to the threaded outer surface of the second body portion such that the securing flange applies pressure to the outer surface of the body.

BRIEF DESCRIPTION OF THE DRAWINGS

The present disclosure will be described in conjunction with the following figures, wherein like numerals denote like elements.

Figure 1:
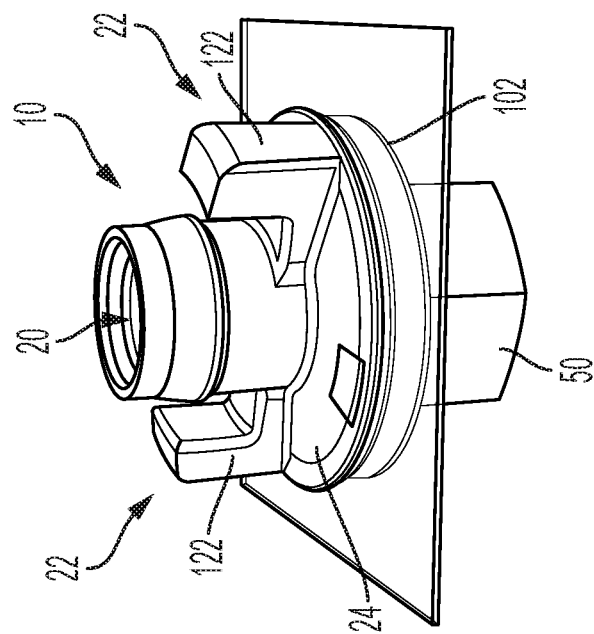
FIG. 1 is a side view of a grommet with portions of the grommet shown in phantom, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The introduction of lithium-ion (Li-Ion) batteries in vehicle interiors raises design issues surrounding the venting of the batteries and battery compartment in certain scenarios. The embodiments discussed herein disclose a repeatable and reliable sealing member or grommet that can be installed from the interior of the vehicle to provide a sealed vent from the battery compartment to the vehicle exterior. The sealing member can be monitored and logged for error proofing and/or traceability if desired to avoid occurrences of incomplete sealing.

FIGS. 1-4 illustrate a sealing member 10, according to an embodiment of the disclosure. The sealing member 10 allows connection of a sealed venting line, such as a venting line 110 shown in FIG. 1, that is used, for example and without limitation, to vent an interior battery compartment to an exterior environment of the vehicle. In various embodiments, the sealing member 10 is a grommet.

The sealing member 10 includes a first body portion designated generally at 12 and a second body portion designated generally at 14. In various embodiments, the first body portion 12 and the second body portion 14 are integrally formed, such as via a molding process. In some embodiments, the sealing member 10 is formed from a suitable flexible, resilient material such as, for example and without limitation, rubber or plastic.

In various embodiments, the vehicle body 102 is sheet metal having an inner surface 104 disposed inward toward a compartment enclosed and defined by the vehicle body 102, such as a battery compartment, and an outer surface 106 disposed outward of the vehicle body 102. In various embodiments, when the sealing member 10 is installed through an opening or aperture in a vehicle body 102, the first body portion 12 is disposed on an internal side of the vehicle body 102 and the second body portion 14 is disposed on an external side of the vehicle body 102.

The sealing member 10 includes an outer surface 16. The outer surface 16 defines an outer circumference of the sealing member 10. In various embodiments, the outer surface 16 includes a locking tab 17. The locking tab 17 extends radially outward from the outer surface 16 of the first body portion 12 and forms a lateral protrusion from the outer surface 16 that is configured to engage with a hose, tube, or other attachment coupled to the first body portion 12 of the sealing member 10, such as the venting line 110 shown in FIG. 1.

The sealing member 10 also includes an inner surface 18. The inner surface 18 defines a cylindrical central passage 20 passing longitudinally from one terminal end of the sealing member 10 to the opposite terminal end of the sealing member 10. The passage 20 allows the passage of gaseous fluids, wires, etc. through the sealing member 10. The passage 20 is generally coaxial with a longitudinal axis A of the sealing member 10. When attached, the venting line 110 forms a sealed extension of the central passage to further direct the flow of gaseous fluids from an interior compartment of the vehicle body 102, such as a battery compartment.

In various embodiments, the inner surface 18 also includes a plurality of ribs 19. The ribs 19 extend radially inward from the inner surface 18 of the sealing member 10. In various embodiments, the ribs 19 engage with corresponding grooves of the venting line 110 to further secure the venting line 110 with the sealing member 10. In some embodiments, the ribs 19 may be removed, based on the design of the venting line 110.

Figure 2:
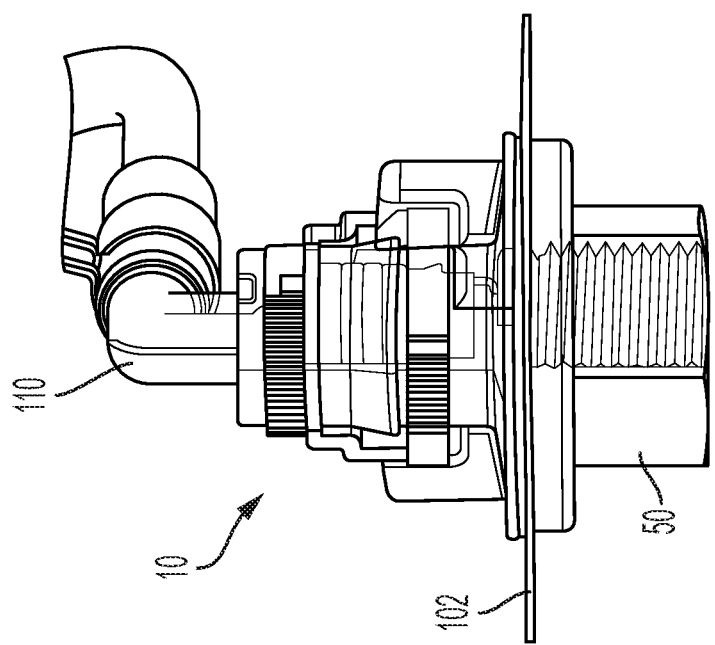
FIG. 2 is a view of the grommet of FIG. 1 from an interior position, according to an embodiment.
Figure 3:
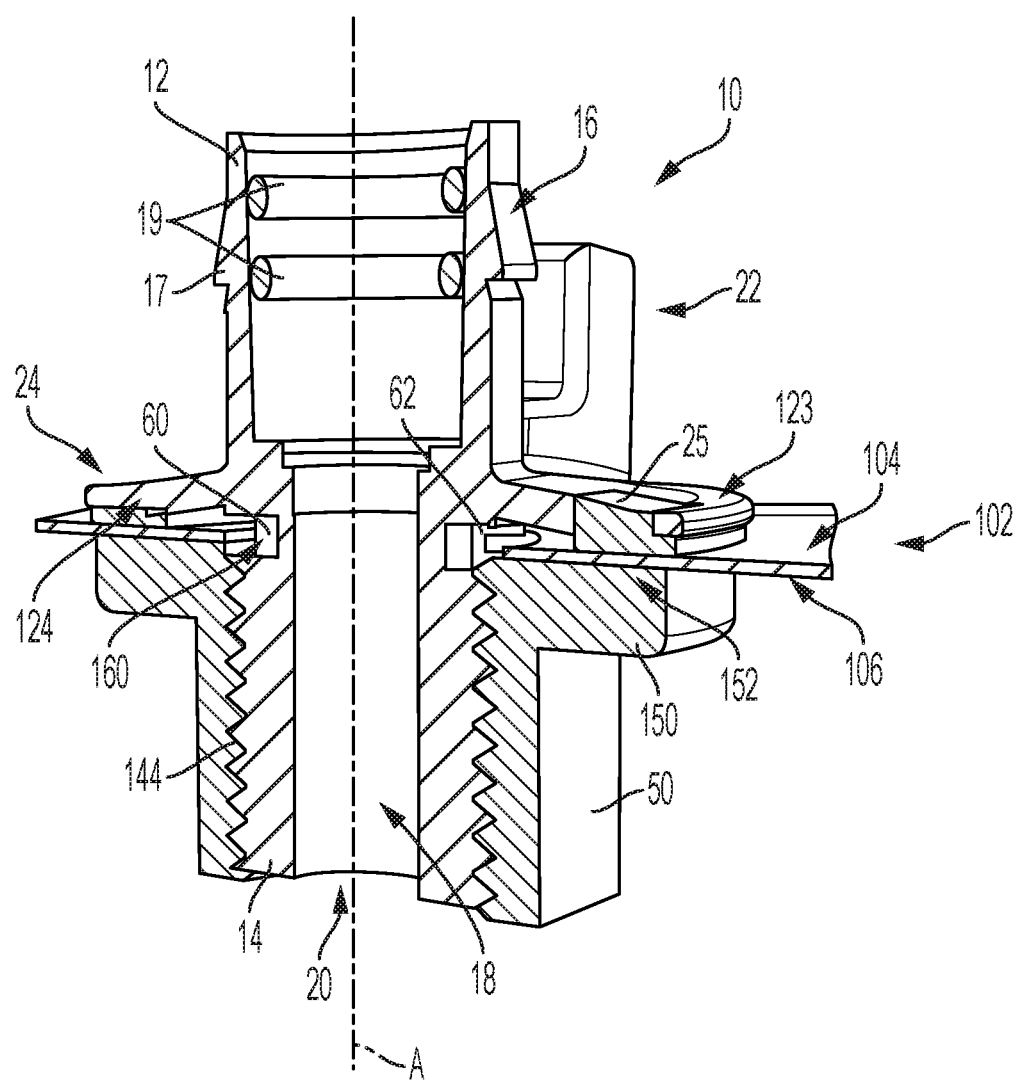
FIG. 3 is a schematic cross-sectional view of the grommet of FIG. 1, according to an embodiment.

00351 With continued reference to FIGS. 1-3, in various embodiments, the sealing member 10 also includes one or more hand levers 22. The hand levers 22 extend radially outward from the first body portion 12 of the sealing member 10. In some embodiments, two hand levers 22 extend from opposite sides of the first body portion 12. The hand levers 22 provide gripping surfaces that can be grasped by the installer during installation to manipulate the radial and longitudinal position of the sealing member 10 within an aperture of the vehicle body 102. In various embodiments, each of the hand levers 22 includes a grasping portion 122. The grasping portion 122 is radially separated from the longitudinal axis A of the sealing member 10. Additionally, each of the grasping portions 122 is generally parallel to the longitudinal axis A. In various embodiments, the hand levers 22 are disposed on opposite sides of the sealing member 10 to easily insert and rotate the sealing member 10 within the opening in the vehicle body 102, as discussed in greater detail herein.

The outer surface 16 of the first body portion 12 also includes a sealing flange 24. The sealing flange 24 includes an upper surface 123 and an underside surface 124. The sealing flange 24 extends radially from the outer surface 16 of the first body portion 12. The underside surface 124 applies pressure to seal the sealing member 10 against the inner surface 104 of the vehicle body 102, as best shown in FIG. 3.

In various embodiments, the sealing member 10 includes a sealing portion 25. The sealing portion 25 may be incorporated into, or separate from, the sealing flange 24. The sealing portion 25 may be made from the same material as the sealing member 10 or may be a different material, such as a pliable rubber, plastic, or other sealing material. In some embodiments, the underside surface 124 of the sealing flange 24 applies pressure to the sealing portion 25 to engage the sealing portion 25 against the inner surface 104 of the vehicle body 102.

With continued reference to FIG. 3, the second body portion 14 of the sealing member 10 is disposed on an opposite side of the vehicle body 102 from the first body portion 12. In various embodiments, the second body portion 14 is disposed on an outer surface of the vehicle body 102. The second body portion 14 includes, in some embodiments, a plurality of threads 144 on the outer surface 16 of the sealing member 10. The threads 144 are configured to engage with corresponding threads of a securing member 50, such as a nut, to secure the sealing member 10 in place in the aperture in the vehicle body 102.

In various embodiments, the securing member 50 includes a radially-extending securing flange 150. The flange 150 extends from the securing member 50 such that when the securing member 50 is threaded on the second body portion 14 of the sealing member 10, a surface 152 of the securing member 50 is adjacent to and in contact with the outside surface 106 of the vehicle body 102. As the securing member 50 is threaded onto the second body portion 14 of the sealing member 10, the surface 152 applies pressure on the opposite side of the vehicle body 102 from the sealing portion 25 of the sealing flange 24. The pressure applied by the surface 152 further secures the sealing member 10 in position in the aperture of the vehicle body 102 and enhances the sealing capability of the sealing member 10.

Figure 4:
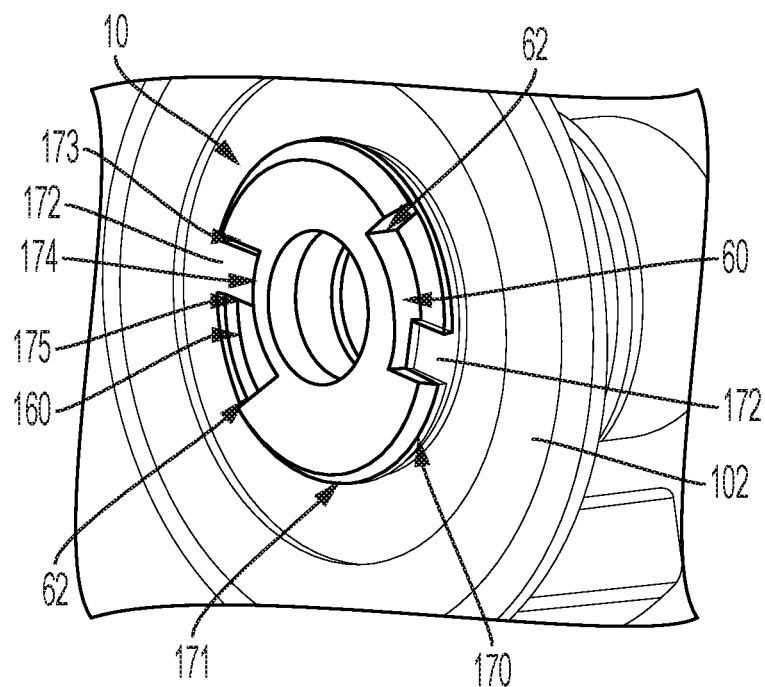
FIG. 4 is a perspective view of a connection interface of the grommet of FIG. 1, according to an embodiment.

With reference now to FIG. 4, the sealing member 10 may be inserted into the aperture in the vehicle body 102 from the interior of the vehicle and rotated within the aperture to initially secure the sealing member 10 within the opening in the vehicle body 102. As shown in FIG. 3, the sealing member 10 includes a channel surface 60 defining a circumferential groove or channel 160 in the outer surface 16 of the sealing member 10. The channel 160 separates the first body portion 12 from the second body portion 14. The channel 160 extends at partially around the circumference of the sealing member 10 and includes a stop surface 62. The stop surface 62 extends perpendicular to the channel surface 60 to stop rotation of the sealing member 10 when the sealing member 10 is inserted into a tabbed opening.

FIG. 4 is a perspective view of the interface between the channel 160 of the sealing member 10 with a tabbed opening 170 defined by an opening edge 171 in the vehicle body 102. The opening edge 171 includes a plurality of tabs 172 (two are shown). The tabs 172 are configured to interface with the stop surfaces 62 of the sealing member 10 to inhibit further rotation of the sealing member 10 within the tabbed opening 170 once the sealing member 10 has been inserted into the opening 170 and rotated into position.

Each tab 172 includes a first side surface 173 and a second side surface 175 connected by an end surface 174 that form a radially inward projecting tab. Each of the first side surface 173 and the second side surface 175 are perpendicular to the opening edge 171 such that each side surface 173, 175 can engage with one of the stop surfaces 62 of the sealing member 10 depending on the direction of rotation of the sealing member 10 as it is inserted into the tabbed opening 170.

In various embodiments, the sealing member 10 is inserted through the vehicle body 102 from the interior side corresponding to the inner surface 104 by aligning the channel 160 with the tabs 172 extending from the opening edge 171 of the vehicle body 102. To initially secure the sealing member 10 to the vehicle body 102, the sealing member 10 is rotated approximately 45 degrees either clockwise or counterclockwise within the tabbed opening 170 until the stop surfaces 62 interface with the respective side surface 173, 175 of the tabbed opening 170. The rotational motion seats the sealing member 10 to the vehicle body 102 and holds the sealing member 10 in place until further installation tasks are completed.

In some embodiments, the sealing portion 25 is placed between the inner surface 104 and the sealing member 10 prior to rotation and seating of the sealing member 10, thus forming an initial seal on the inner surface 104 of the vehicle body 102 due to pressure applied by the sealing flange 24.

Next, the securing member 50 is threaded onto the second body portion 14 of the sealing member 10. As shown in FIG. 3, the second body portion 14 extends outward of the vehicle body 102; thus, the securing member 50 is installed from the exterior of the vehicle body 102. As the securing member 50 is tightened onto the second body portion 14, the interaction between the stop surfaces 62 and the tabs 172 acts as a torque reaction feature. Once the desired torque of the securing member 50 to the second body portion 14 is achieved, the sealing member 10 is sealed to the vehicle body 102. Connection of a hose or line such as the venting line 110 shown in FIG. 1 enables venting through the sealing member 10.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions; sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, hut that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for sealed venting of a compartment defined by a body having an inner surface and an outer surface and an aperture defined therethrough, the system comprising:
   a sealing member comprising
      a first body portion and a second body portion, the second body portion having a threaded outer surface;
      an inner sealing member surface defining a central passage passing longitudinally from a first terminal end of the sealing member to a second terminal end of the sealing member and coaxial with a longitudinal axis of the sealing member;
      an outer sealing member surface defining an outer circumference of the sealing member;
      a sealing flange extending radially outward from the outer sealing member surface; and
      a channel formed in the sealing member and separating the first body portion from the second body portion, the channel including at least one stop surface;
   a sealing portion positioned between the sealing flange and the inner surface of the body; and
   a securing member having a securing flange, the securing member configured to engage with the threaded outer surface of the second body portion such that the securing flange is adjacent to the outer surface of the body;
   wherein the channel engages with the aperture defined in the body when the sealing member is inserted into and rotated in the aperture and the sealing portion and the securing flange seal the sealing member to the inner and outer surfaces of the body.

2. The system of claim 1, wherein the sealing member further comprises a locking tab extending radially outward from the outer sealing member surface of the first body portion.

3. The system of claim 2 further comprising a venting line configured to engage with the locking tab of the sealing member, the venting line defining a passage connected to the central passage to direct a flow of fluid from the compartment to an exterior environment of the body.

4. The system of claim 3, wherein the inner sealing member surface includes at least one rib configured to engage with the venting line.

5. The system of claim 1, wherein the sealing member further comprises a hand lever extending radially outward from the first body portion, the hand lever including a grasping portion radially separated from and parallel to the longitudinal axis of the sealing member.

6. The system of claim 1, wherein the at least one stop surface engages with the aperture of the body to inhibit rotation of the sealing member when the securing member engages with the threaded outer surface of the second body portion of the sealing member.

7. The system of claim 1, wherein the securing flange applies pressure to the outer surface of the body and the securing flange applies pressure to the sealing portion positioned between the securing flange and the inner surface of the body to seal the aperture in the body and create a venting passage from the compartment through the central passage.

8. An automotive vehicle, comprising:
a vehicle body having an inner surface and an outer surface and an aperture formed therein by an aperture edge, the aperture edge comprising a tab extending radially into the aperture;
a sealing member comprising
a first body portion and a second body portion, the second body portion including a threaded outer surface;
an inner sealing member surface defining a central passage extending through the first and second body portions of the sealing member and coaxial with a longitudinal axis of the sealing member;
an outer sealing member surface defining a first outer circumference of the sealing member;
a sealing flange extending radially outward from the outer sealing member surface and defining a second outer circumference of the sealing member;
a channel including a stop surface; and
a securing member having a securing flange, the securing member configured to engage with the threaded outer surface of the second body portion;
wherein the stop surface engages with the tab when the sealing member is inserted into and rotated in the aperture to limit rotation of the sealing member within the aperture.

9. The automotive vehicle of claim 8 further comprising a sealing portion positioned between the sealing flange and the inner surface of the vehicle body.

10. The automotive vehicle of claim 9, wherein the securing flange applies pressure to the outer surface of the body and the sealing portion and the securing flange seal the sealing member to the inner and outer surfaces of the vehicle body.

11. The automotive vehicle of claim 8, wherein the sealing member further comprises a locking tab extending radially outward from the outer sealing member surface.

12. The automotive vehicle of claim 11 further comprising a venting line configured to engage with the locking tab of the sealing member, the venting line defining a passage connected to the central passage of the sealing member to direct a flow of fluid to an exterior environment of the vehicle body.

13. The automotive vehicle of claim 12, wherein the inner sealing member surface includes at least one rib configured to engage with the venting line.

14. The automotive vehicle of claim 8, wherein the sealing member further comprises a first hand lever extending radially outward from a first radial position of the first body portion and a second hand lever extending radially outward from a second radial position 180 degrees from the first radial position, the first hand lever including a first grasping portion and the second hand lever including a second grasping portion, each of the first and second grasping portions radially separated from and parallel to the longitudinal axis of the sealing member.

15. The automotive vehicle of claim 8, wherein the stop surface engages with the tab extending from the aperture edge of the aperture of the vehicle body to inhibit rotation of the sealing member when the securing member engages with the threaded outer surface of the second body portion of the sealing member.

16. A method for sealed venting of a battery compartment enclosed by a body, the method comprising:
providing the body, the body having an inner surface and an outer surface and an aperture defined therethrough, the aperture defined by an edge including a tab;
providing a sealing member comprising
a first body portion;
a second body portion having a threaded outer surface;
an inner sealing member surface defining a central passage passing longitudinally from a first terminal end of the sealing member to a second terminal end of the sealing member and coaxial with a longitudinal axis of the sealing member;
an outer sealing member surface defining an outer circumference of the sealing member;
a sealing flange extending radially outward from the outer sealing member surface; and
a channel formed in the sealing member and separating the first body portion from the second body portion, the channel including a stop surface;
providing a sealing portion;
providing a securing member having a securing flange, the securing member configured to engage with the threaded outer surface of the second body portion;
positioning the sealing portion against the inner surface of the body;
inserting the sealing member into the aperture from an interior of the battery compartment such that the sealing portion is between the inner surface of the body and the sealing flange;
rotating the sealing member within the aperture such that the stop surface engages with the tab of the aperture; and
threading the securing member to the threaded outer surface of the second body portion such that the securing flange applies pressure to the outer surface of the body.

* * * * *